April 18, 1933.  A. ANDERSON  1,903,969
BORE HOLE SURVEYING APPARATUS
Original Filed May 11, 1927     3 Sheets-Sheet 3
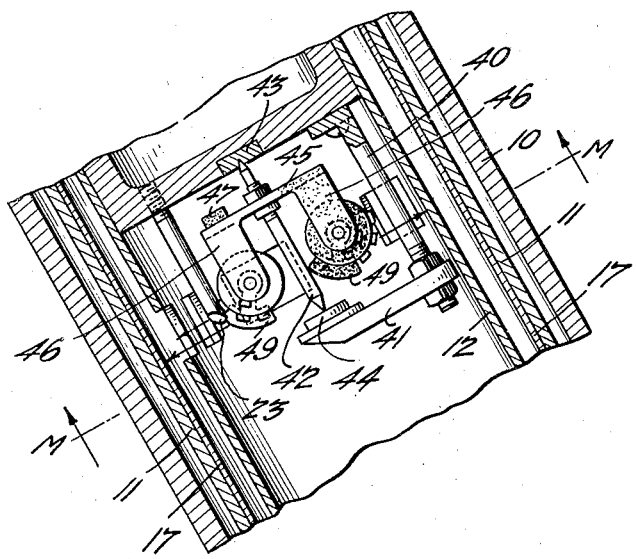
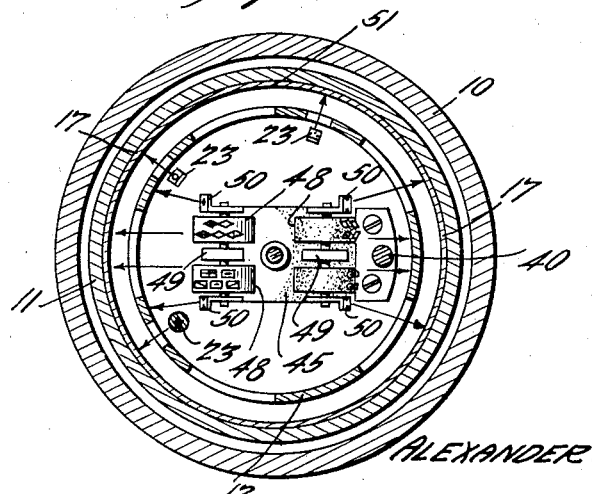
Inventor
ALEXANDER ANDERSON
By
Attorney Patented Apr. 18, 1933

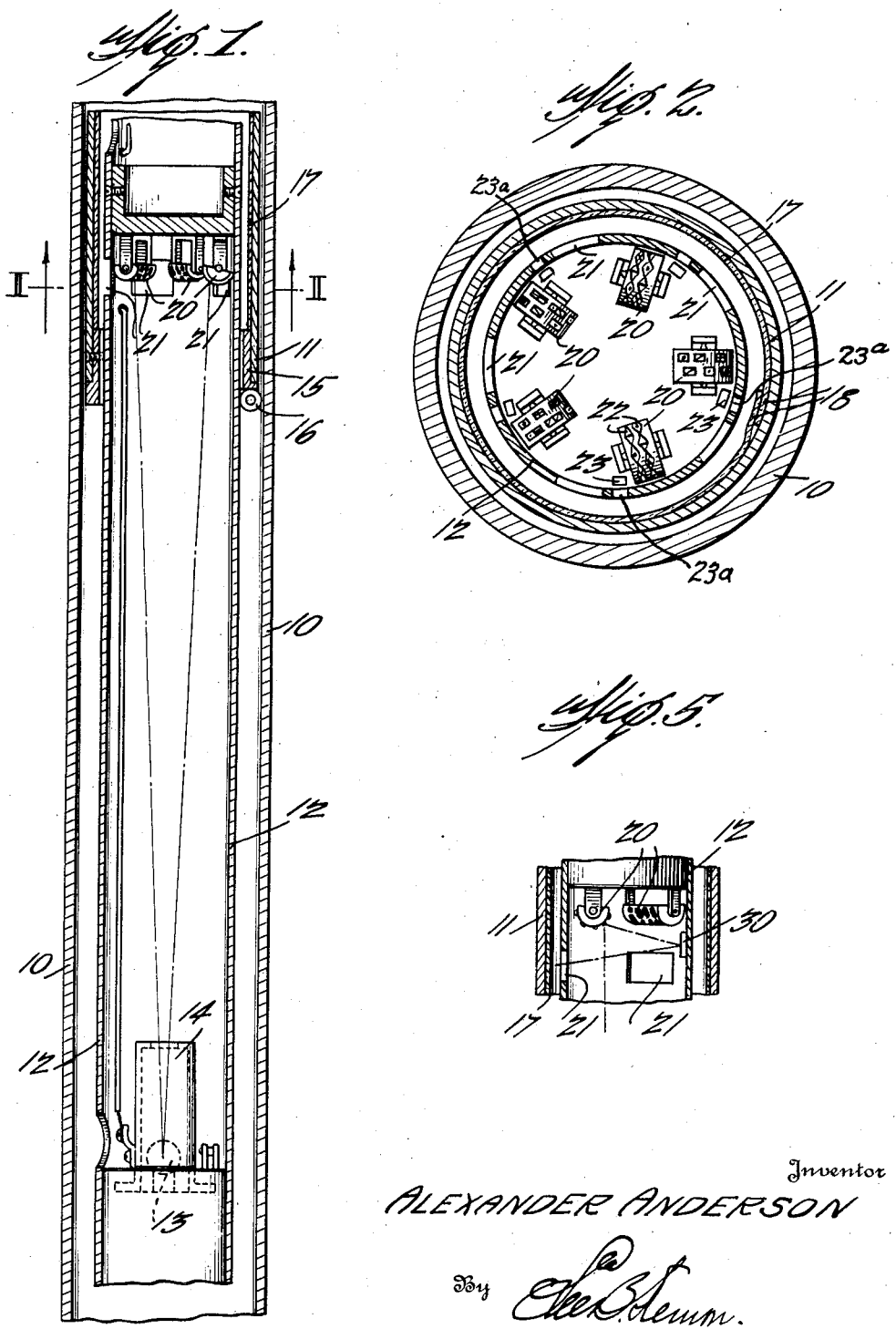

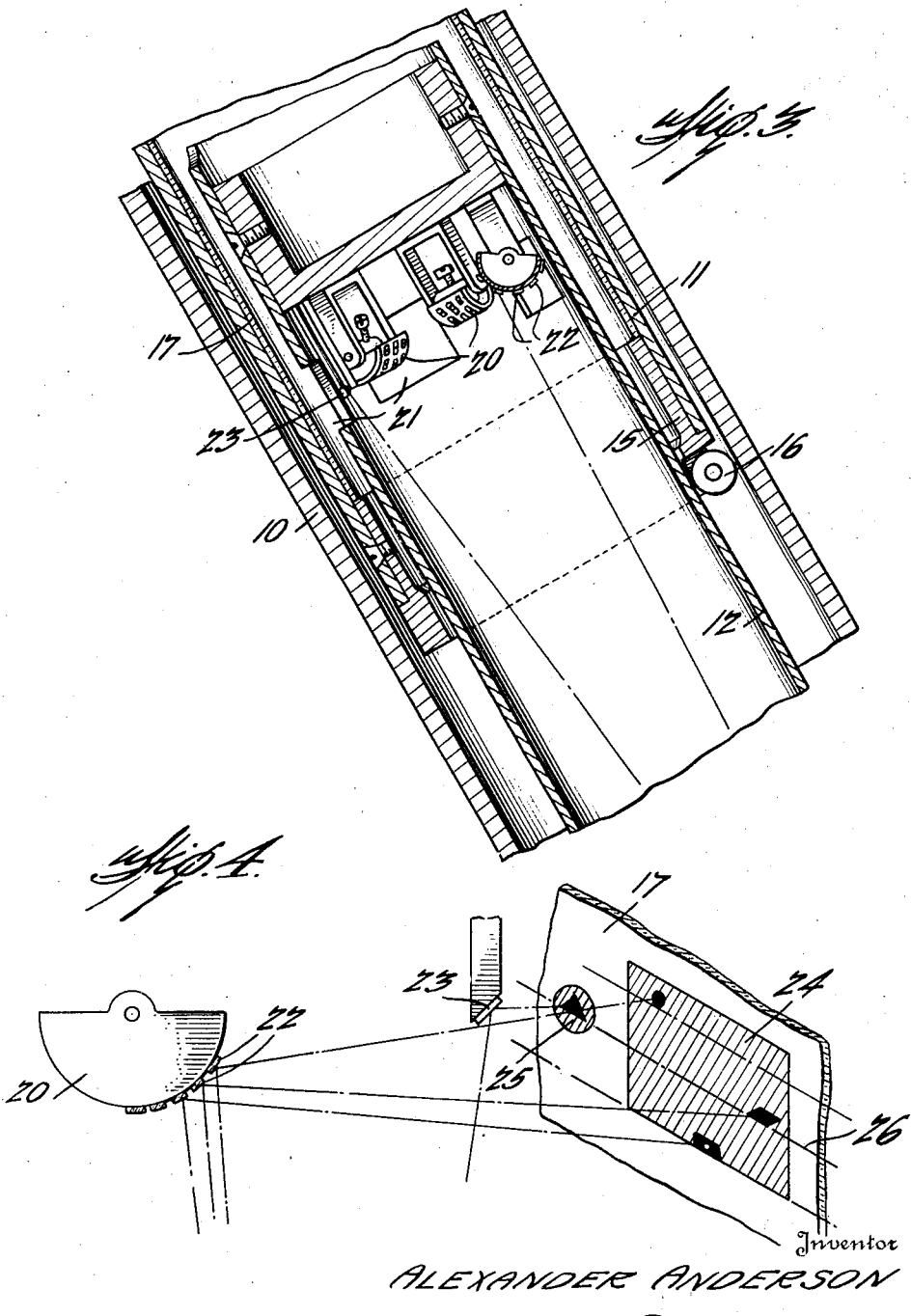

1,903,969

UNITED STATES PATENT OFFICE

ALEXANDER ANDERSON, OF FULLERTON, CALIFORNIA

BORE HOLE SURVEYING APPARATUS

Original application filed May 11, 1927, Serial No. 190,641. Divided and this application filed March 4, 1931. Serial No. 520,096.

This invention relates to an apparatus for surveying bore holes and more particularly to an improvement upon the apparatus shown and described in Letters Patent No. 1,801,132 granted to me on an application filed August 28, 1924, Ser. No. 734,577; and the instant application is a true division of my previous application Ser. No. 190,641 filed May 11, 1927.

It is an object of this invention to provide an improved apparatus for accurately ascertaining the amount of inclination of a bore hole and if desired the direction of such inclination relative to a chosen diameter of the apparatus.

It is a further object of my invention to provide a survey device which may be attached to a line of pipe or other supporting means and lowered into the bore hole for the purpose of automatically making a record of the changes of inclinations as the device is moved along the bore hole. In the embodiment of the invention shown and described herein, a light-sensitive record member is employed together with a light source and an improved form of reflecting means which is operative to produce a record or records of inclination upon the light-sensitive record member upon energizing the light source.

In accordance with the present invention, the reflecting means comprises one or more movable reflectors each mounted for movement in a single plane in combination with means for establishing a reference point, line or plane whereby the inclination or tilting of the survey device may be more accurately determined. The last-mentioned means preferably comprises or includes one or more fixed mirrors positioned to reflect light from the light source upon the light-sensitive record member.

Another object of this invention is to provide a reflecting means adapted to make accurate survey records within an outer casing of very small diameter. This form of the apparatus may include a fixed reflector adapted to receive light from a movable reflector and reflect it onto the light sensitive member.

Other objects and advantages of the invention will be apparent from consideration of the embodiment thereof shown in the accompanying drawings, wherein Figure 1 is a vertical section of the portion of the survey device in which the present invention is embodied;

Fig. 2 is a cross section of the same taken on the line II—II of Fig. 1;

Fig. 3 is an enlarged fragmentary view, partially in section and partially in elevation, showing the detailed construction of the reflecting means and associated elements;

Fig. 4 is a diagrammatic view illustrating the underlying principles of the invention; and Fig. 5 is a fragmentary view of a modification.

Fig. 6 is a fragmentary section showing a reflecting device and associated elements of a modified form.

Fig. 7 is a cross section taken on the line M—M of Fig. 6.

Referring particularly to Figs. 1, 2 and 3 of the drawings, the surveying instrument shown is of the type disclosed in my prior patent referred to above, being adapted to be attached to a line of pipe or other supporting means and lowered into a bore hole to be surveyed, the supporting means for example forming part of the usual drilling or operating equipment at the well. The instrument comprises an outer shell 10, corresponding in all essential respects to the element C of the instrument described in said prior patent, a record-supporting or film-carrying sleeve 11 and an instrument tube 12 both suitably supported within the shell 10.

A light source, such as an electric lamp 13, is supported near the lower end of the tube 12 and is adapted to cooperate with reflecting means also carried by the tube and to be described in detail hereinafter whereby a record is made of the inclination of the instrument to the vertical when in position in a bore hole. A light trap member 14 enclosing the lamp 13 except for an aperture at the top may be arranged as shown to prevent undue dispersion of the light with consequent undesired exposure of the record sheet. For an understanding of the present invention, it is sufficient to consider merely the construction and relationship of the light source, reflecting means and light-sensitive record member but the present instrument may, and preferably does, also embody means such as that shown in said prior patent for moving the film-carrying sleeve and for controlling the energization of the light source.

The film-carrying sleeve 11 is provided with an end collar 15 having rollers 16 engaging the tube 12 to centralize the sleeve 11 and facilitate its relative movement with respect to the tube. A cylindrical film or light-sensitive sheet 17 is supported by the collar 15 within and closely conforming to the interior surface of the sleeve 11. The film 17, in reality, is a rectangular sheet which is curved into cylindrical form, the edges preferably slightly overlapping as indicated at 18 in Fig. 2.

The film-carrying sleeve 11 may be transparent and the film 17 may in that case be wrapped around the exterior thereof; and instead of using a rectangular sheet of film, a number of vertical strips of film may be employed which are arranged in a generally cylindrical film-carrying sleeve in such manner as to receive the light impressions from the reflecting means.

One form of reflecting means comprises two or more movable reflecting elements 20 each pivotally or movably supported in a single plane. Each of the reflecting elements 20 comprises a semi-cylindrical block or shell pivoted upon a horizontal axis in such a manner as to assume angular positions depending upon the direction and extent of tilting of the instrument, it being the object of the invention to provide an instrument for measuring and recording these factors. As shown, the axis of each element 20 is perpendicular to a radius of the instrument tube 12.

It is convenient to employ five reflecting elements equally spaced from each other around the central axis of the instrument with their axes in a single plane, as shown in Fig. 2. The instrument tube 12 which constitutes a shield for the light sensitive record member, is provided with a series of apertures 21, corresponding in number to the number of reflecting elements and through which the reflecting elements can reflect light to make a record upon the film 17. In order to obtain characteristic records from which the inclinations of the instrument may be determined, the periphery of each reflecting element is provided with distinctive reflecting areas 22. These distinctive areas which produce varying or different impressions or images upon the film may be formed in any desired manner, as by marking or scratching small mirrors or reflecting surfaces or by utilizing mirrors of different and distinctive shapes.

These distinctive reflecting areas are preferably flat and are preferably tangential to the periphery of the semi-circular shell and are preferably spaced around the shell at equal angular intervals or may be spaced at unequal known intervals.

In accordance with a further feature of the invention, one or more fixed mirrors 23, of which five are shown, are also arranged to provide a reference point or line upon the film to facilitate the measurement of the results and improve the accuracy thereof. Suitably located apertures 23a (Fig. 2) in the instrument tube 12, corresponding in number to the fixed reflectors 23, permit the light reflected from them to register on the film. If only one fixed mirror is employed, the overlapping ends 18 of the film (Fig. 2) are arranged opposite this mirror whereby impressions are made upon both ends of the film by the single mirror. A line joining these two impressions on the flattened film, after it is developed, serves as a reference line from which to measure the deflections of the reflecting elements 20.

Although the single fixed mirror is sufficient, it is convenient to arrange a plurality of fixed mirrors 23 as shown, in case the film is underexposed and the impression on the end of the film which is covered by the other end is weak or indistinct. Where separate strips of film are employed as above described, it is desirable to utilize a fixed mirror 23 in connection with each strip.

The principles underlying the invention will be clear upon reference to Figs. 3 and 4. The instrument is lowered to a position in the bore hole where it is desired to determine the inclination and the direction of inclination of the bore. While the instrument is held stationary, the lamp 13 is flashed by any suitable means, such for example as that shown in my prior patent above referred to. As shown in Fig. 3, each of the reflecting elements 20 assumes positions depending upon the extent and direction of the inclination of the instrument and therefore of the bore hole in which it is positioned. A distinctive image or record 24 (Fig. 4) is thus produced upon the film 17, which may be developed by well known photographic methods, and from which the extent and direction of inclination may be determined. Although only the record corresponding to a single reflecting element 20 is shown in Fig. 4, it will be apparent that similar records are obtained upon the film 17 corresponding to the position of each of the reflecting elements, and it is from these several records, simultaneously made, that the inclination and the direction of inclination may be determined.

The fixed mirror or mirrors 23 are operative to produce a record 25 (Fig. 4) through which a reference line 26 may be drawn in order that the deflections of the elements 20 may be measured more conveniently and accurately. The provision of a plurality of fixed mirrors 23 or the production of two impressions from a single mirror, as described above, permits the accurate plotting on the final record of the exact angular position of the reflecting elements 20 or other reference line which is essential for precise measurement of the quantities under consideration.

Various modifications in the detailed construction and arrangement may be made without departing from the scope of the invention. Thus, as shown in Fig. 5, where the diameter of the instrument tube 12 is small, a relatively fixed mirror 30 may be arranged to reflect the light from each of the reflecting elements 20 through the apertures 21. In this manner, the reflecting elements 20, which are closer together than in the first modification described above, are prevented from shielding the apertures through which the exposure of the film is accomplished and the length of the path of the beam of light reflected from the mirrors of the element 20 onto the record member 17 is thereby increased. In this way, the amount of movement of the reflected image on the record, caused by a given tilting of the apparatus, is magnified to the end that a greater accuracy of measurement may be obtained.

When the film is in cylindrical form in the sleeve 11 as shown in Fig. 2 and the apparatus is in a vertical position, then the line 26 (Fig. 4) is a circle and lies in a horizontal plane, which I shall call the reference plane.

In order to simplify the explanation of the way in which the data obtained from the film record (Fig. 4) made by each reflecting element upon a single flashing of the light is interpreted, I will suppose that only two reflecting elements 20 are used and that these elements are placed at right angles to each other.

When the apparatus is in a vertical position as in Fig. 1, then the records thrown upon the film by each of the two elements both indicate zero inclination.

Now, if the apparatus is tilted in the vertical plane perpendicular to the axis of one of the elements 20, that element will record the full amount of inclination of the apparatus and, owing to the characteristic nature of the reflected image, it will also record the direction in which it has rotated, so that the direction of inclination relative to the element and to a diameter of the apparatus is known. The second element will record zero inclination because its axis has been tilted endways and the center of gravity of the movable element 20 remains vertically below the axis without any rotation.

The second case occurs when the apparatus is tilted in a plane which is not perpendicular to either of the axes of the elements 20. In this case, both elements rotate by an amount less than the total inclination of the apparatus and each of the two elements records a component of the inclination. In fact, each element records the inclination of a radius drawn on the reference plane perpendicular to its own axis and also the direction of inclination of this radius with respect to its axis. From the data defining the inclination and relative direction of inclination of these two lines which, in this case, lie in the reference plane at right angles to each other, the amount and direction of inclination of the plane and of the apparatus may be computed by well known methods.

When more than two reflecting elements are employed, then the amount of data available is increased. Another important advantage of using more than two reflecting elements arises when, owing to rough handling of the apparatus during use, a bearing of one of the reflecting elements is slightly damaged. The damaged element will develop friction and the records reflected from it will cease to agree with the records reflected from the remaining elements. By using five symmetrically arranged elements, an ample margin of data is obtained and the records reflected from any damaged element can be easily recognized as bad and can be eliminated with certainty, the calculations being based on the data of the undamaged elements which are in perfect agreement.

Another form or modified arrangement of reflecting device for my bore hole survey apparatus is shown in Figs. 6 and 7.

In these figures, the outer shell 10, the film-carrying sleeve 11, the instrument tube 12, the light-sensitive film 17 and fixed mirrors 23 correspond to similar elements bearing like numerals shown in Figs. 1 to 5.

The arrangement of this modification includes an axially supported and rotatably mounted mirror carriage or frame 45. The latter is fixed to, and carried by, a shaft 42, the bearings for which are shown at 43 and 44. The upper bearing 43 is secured to a member which closes the instrument tube 12; and the lower bearing 44 is fixed to a bracket arm 41 carried by a dependent arm 40 which is secured at its upper end to the same member which carries the upper bearing and which forms a closure for the upper end of the instrument tube. The shaft 42 is positioned axially of the instrument tube and rotation of the mirror carriage is therefore about this axis. The mirror carriage 45 is provided with depending flange parts 46, of which there are two at each end, and the pair at each end constitutes bearings for a shaft which extends therebetween. On each of such shafts there is fixed a pair of cylindrical members or disks 48, each carrying on its cylindrical surface a plurality of small mirrors or reflectors. As already described in connection with the preceding embodiments of this invention, the mirror elements are of such shape or configuration as that each individual mirror will reflect a characteristic image. These individual mirrors are also preferably arranged on the cylinder at equal angular intervals. Each pair or set of mirror elements 48 is capable of independent movement with relation to the other pair, and the supporting shaft of each set is counterbalanced by a weight 49 which acts to maintain the position of the mirror elements with relation to a true vertical in spite of the tilting of the apparatus as a whole.

The mirror carriage 45 and the shaft 42 on which it is mounted may rotate about the axis of the instrument tube 12, but such rotation is controlled by an out-of-balance weight 47 mounted on the carriage which will exert a couple or force to move the carriage into a position, and in accordance with the direction of tilting of the apparatus, where the weight is in the plane of the direction of tilt and beneath the shaft 42. Therefore, the movable set of mirrors will be able to make a record not only of inclination but also of the direction of such inclination.

As a further element of the system of reflectors or mirrors, there is provided, in this embodiment of the invention, a set of fixed or datum mirrors 23, the function of which is identical with that of the fixed mirrors described in connection with the constructions of Figs. 1-4 inclusive. The positioning of this set of fixed mirrors which may be of any convenient number, is clearly shown in Fig. 7, with an arrow from each such element showing the direction of the reflected image through an opening in the wall of the instrument tube 12, and directed on to the film or record receiving surface 17. Also, still another set of reflectors or mirrors is provided, and shown in the drawings at 50. These reflectors are fixed to the lower edges of the depending flanges or arms 46 of the movable mirror carriage, and each will reflect a characteristic image as indicated by the arrows in Fig. 7. The number of records to be made by this set of mirrors will depend on the rotational position of the mirror carriage, and in the position of the carriage as shown in Fig. 7, two such records will be made, the other two being prevented by the wall of the tube 12. This arrangement of mirrors is such, however, that at least two images will always be recorded for each rotational position of the mirror frame. The positions of these records on the film 17, and the number of such records, will aid in a determination of the direction of inclination or tilting of the instrument as a whole, when the particular record was made. With this embodiment of the invention, it is understood that a suitable light source, as 13 in Fig. 1, is employed, the beams from which are caught and reflected by the several sets of reflectors or mirrors above described.

When the apparatus of Figs. 6 and 7 is in a vertical position, the records made upon the film 17 by the various mirrors will indicate zero inclination.

When the apparatus occupies an inclined position as in Fig. 6, the weight 47 causes the carriage or frame 45 to rotate so that the weighted end of the frame will assume the lowest possible position with respect to shaft 42 and the counter-balance weights 49 will be effective to maintain the position, relative to the vertical, of the cylindrical mirror supports 48. The centers of gravity of the weights 49 will always lie in the vertical planes passing through the axes of the mirror supports 48.

Relative rotation between the cylindrical mirror supports 48 and the carriage 45 in response to tilting, results in the zero mirrors on the weighted end of the frame 45 moving upward and those on the other end moving downward. The mirrors in their new position will reflect different impressions onto the film 17 through openings provided in instrument tube 12. The angular arrangements of the mirrors on the cylinders 48 being known, the inclination of the apparatus can now be determined by comparative analysis of the distinguishing markings of the impressions produced by the light reflected by the mirrors in their new position.

The direction of inclination is measured from the center of one of the darkened areas (similar to 24 in Fig. 4) across the flattened out film to the position of an imaginary axis of the frame 45 to which all the mirror impressions have a known angular relation.

Reference lines, similar to 26 in Fig. 4, may be drawn on the flattened out film by means of the images recorded thereon from the fixed mirrors 23. These reference lines will facilitate accurate measurement of the vertical angles recorded by the mirrors on the cylinders 48.

With the mirrors 50 in use, direction of inclination may be obtained by measurement from their images, instead of from those of the mirrors on the cylinders 48, and the process of calibrating the apparatus is simplified.

The direction of inclination may also be determined by measuring from the known position of an impression of one of the fixed mirrors 23.

Instead of using reference lines drawn through impressions of the mirrors 23, reference lines may be drawn through impressions from the mirrors 50.

It is to be understood, that one pair of cylindrical supports 48, their respective mirrors, and weight 47 may be dispensed with. These dispensable parts are stippled in Figs. 6 and 7. The apparatus as shown in the figures is preferred, however, as it provides verifying or check records to avoid errors or inaccuracies in survey work.

I claim:

1. In combination in a bore surveying instrument, a light-sensitive record member a light source and a plurality of reflecting members adapted to reflect light from such source upon such record member one of such reflecting members being fixed and the other being mounted for movement.

2. In combination in a bore surveying instrument, a light-sensitive record member a light source and a plurality of reflecting members adapted to reflect light from such source upon such record member one of such reflecting members being fixed and the other being mounted for movement in response to variations in the inclination of the instrument.

3. In combination in a bore surveying instrument, a light-sensitive record member a light source and a plurality of reflecting members adapted to reflect light from such source upon such record member, one of said reflecting members being pivotally supported upon an axis transverse to the longitudinal axis of the instrument and the other being fixed and positioned substantially in the same transverse plane as the first-mentioned reflecting member.

4. In combination in a bore surveying instrument, a light-sensitive record member a light source and a plurality of reflecting members adapted to reflect light from such source upon such record member, said reflecting members being pivoted upon non-parallel axes lying in a common plane which plane is at an angle to the longitudinal axis of the instrument whereby each of said reflecting members is affected differently by changes in the inclination of the instrument from the vertical and by changes in the direction of the inclination.

5. In combination in a bore surveying instrument, a light-sensitive record member a light source and a plurality of reflecting members adapted to reflect light from such source upon such record member one of such reflecting members being fixed and the other being mounted for movement in response to variations in the direction of inclination of the instrument.

6. In combination in a bore surveying instrument, a light-sensitive record member a light source and a plurality of reflecting members adapted to reflect light from such source upon such record member each reflecting member being mounted for pivotal movement relative to the light source in a single plane, and individual supports for the said reflecting members which are fixed with respect to the light force.

7. In combination in a bore surveying instrument, a light-sensitive record member a light source and a plurality of reflecting members adapted to reflect light from such source upon such record member some of such members being movable and others of such members being fixed, each movable member adapted to reflect light upon one of such fixed members.

8. In combination in a bore surveying instrument, a light-sensitive record member a light source and a plurality of swinging reflecting units each mounted upon an axis fixed with respect to the light source, a mirror of each unit adapted to reflect light from such source upon such record member, and each unit adapted to make an independent record upon said light-sensitive record member, such independent records being adapted to be combined to produce a single complete record of inclination and direction of the inclination.

9. In combination in a bore surveying instrument, a light-sensitive record member a light source and a plurality of swinging reflecting units a mirror of each unit adapted to reflect light from such source upon such record member, and each unit adapted to make an independent record upon said light-sensitive record member such independent records being adapted to be combined to produce a single complete record of inclination and direction of the inclination, and a fixed mirror adapted to reflect an image upon such record member for the purpose of providing thereon a reference impression.

10. In combination in a bore surveying instrument, a light-sensitive record member, a light source and a plurality of reflecting members adapted to reflect light from such source upon such record member one of such reflecting members being fixed, the other being mounted to move in response to variations in the inclination of its support, and a shield mounted between such light source and such record member and provided with a plurality of perforations through which such reflecting members are adapted to reflect, the said record member being mounted for movement relative to the said shield.

11. In combination in a bore surveying instrument, a light-sensitive record member, a light source and a plurality of reflecting members adapted to reflect light from such source upon such record member, such reflecting members being mounted upon a fixed support each of them mounted for swinging movement about a single axis in response to inclination of its support, and a shield mounted between such light source and such record member and provided with a perforation through which such reflecting members are adapted to reflect.

12. In combination in a bore surveying instrument, a light-sensitive record member, a light source and a plurality of reflecting units having a mirror adapted to reflect light from such source upon such record member, one reflecting unit being fixed the remainder being movable and mounted upon a fixed support each of the movable units being mounted for swinging movement about a single axis in response to inclination of its support and adapted to reflect light upon such fixed reflecting member, and a shield mounted between such light source and such record member and provided with a perforation through which such reflecting members are adapted to reflect.

13. In combination in a bore surveying instrument, a light-sensitive record member, a light source and a plurality of reflecting members adapted to reflect light from such source, some of such reflecting members being mounted for movement relative to said light source and others of said reflecting members being fixed with respect to said light source, the movable reflectors being adapted to reflect light from said light source upon said relatively fixed reflecting members for reflection onto said light-sensitive record member.

14. In combination in a bore surveying instrument, a light-sensitive record member, a light source and a plurality of reflecting members, a perforated shield adjacent said record member, two or more of said reflecting members being mounted for operative movement relative to said light source and a corresponding number of reflecting members being fixed relative to said light source, said movably mounted reflectors being adapted to reflect light from said light source upon said relatively fixed reflectors for reflection upon said shield, the perforations in said shield being adapted to permit a part of said reflected light to fall upon the surface of said light-sensitive record member to make a record thereon.

15. In combination in a bore surveying instrument, a light source, a plurality of reflecting members, a perforated shield of opaque material and a light-sensitive record member; at least two of said reflecting members being mounted for movement relative to said shield and and a like number of reflecting members being fixed relative to said shield, said shield being positioned between said fixed reflector and said light-sensitive record member, said movably mounted reflectors being adapted to reflect light from said light source upon said fixed reflectors for reflection upon said shield, the perforations in said shield being adapted to permit a part of said reflected light to fall on the surface of said light-sensitive record member to make a record of inclination thereon.

16. In combination in a bore surveying instrument, a light sensitive record member, a light source and a plurality of reflecting members adapted to reflect light from said source onto said record member, one of said reflecting members being mounted for movement the path of which lies in a plane at right angles to the longitudinal axis of the apparatus, and a second reflecting member mounted for movement about an axis the plane of which is parallel to the plane of movement of the first mentioned reflecting member.

17. In combination in a bore hole survey apparatus, a light sensitive record member, a light source and a plurality of reflecting members adapted to reflect light from the light source onto the record member, one of said reflecting members being supported in fixed angular relation to said light source and another reflecting member mounted for movement relative to the light source and to said first mentioned reflecting member in response to changes in inclination of the apparatus.

18. In combination in a bore hole survey apparatus, a light sensitive record member, a light source and a plurality of reflecting members adapted to reflect light from the light source onto the record member, one of said reflecting members being fixed against movement relative to the light source and another of said reflecting members being mounted to move in response to variations in inclination of the apparatus to change its angular relation with respect to the light source.

ALEXANDER ANDERSON.